United States Patent [19]
Imajyo et al.

[11] 3,879,696
[45] Apr. 22, 1975

[54] SURGE VOLTAGE ABSORBER

[75] Inventors: Yasutaka Imajyo; Ikuo Takano, both of Tokyo, Japan

[73] Assignee: Tokyo Shibaura Electric Co., Ltd., Kawasaki-shi, Japan

[22] Filed: Dec. 20, 1973

[21] Appl. No.: 426,599

[30] Foreign Application Priority Data
Feb. 20, 1973   Japan.................. 48-22003
Feb. 20, 1973   Japan.................. 48-22004

[52] U.S. Cl. .................. 337/244; 337/4; 338/21; 317/40 A
[51] Int. Cl. ............................ H01h 85/30
[58] Field of Search ......... 338/20, 21, 31; 337/244, 337/241, 184, 4; 317/41, 61.5, 50, 66, 31, 32, 40 A

[56] References Cited
UNITED STATES PATENTS
3,450,949   6/1969   Inglis ..................... 337/244 UX
3,781,607   12/1973   DiMarco et al. ............. 317/40 A X

*Primary Examiner*—R. N. Envall, Jr.
*Attorney, Agent, or Firm*—Oblon, Fisher, Spivak, McClelland & Maier

[57] ABSTRACT

A surge voltage absorber wherein there are received in a molded case a plurality of surge voltage absorber units whose alarming members are immediately popped out, the moment said absorbing units have been lost their surge absorbing functions; the molded case is fitted with a lever actuated by the projection of at least one of said alarming members and further with an electric signal generator for giving forth an electric signal upon the actuation of said lever.

2 Claims, 11 Drawing Figures

FIG. 3A
FIG. 3B
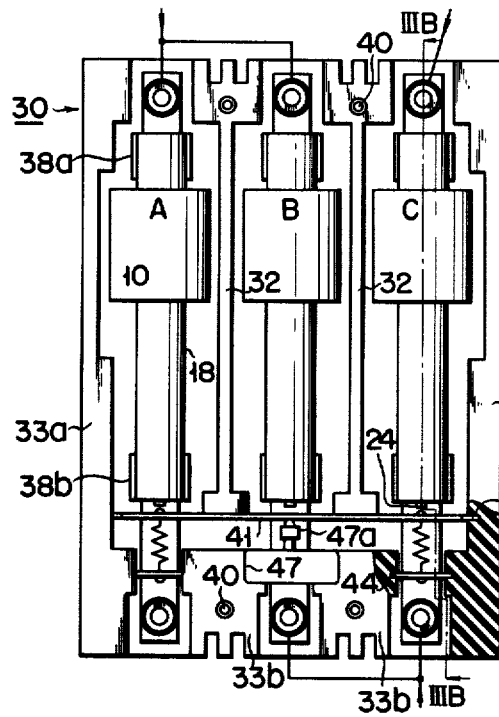
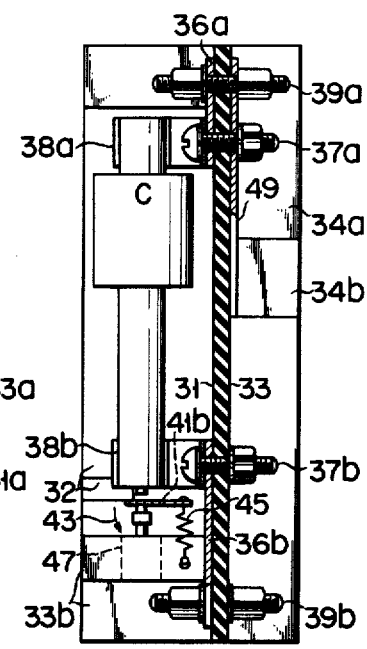
FIG. 3C
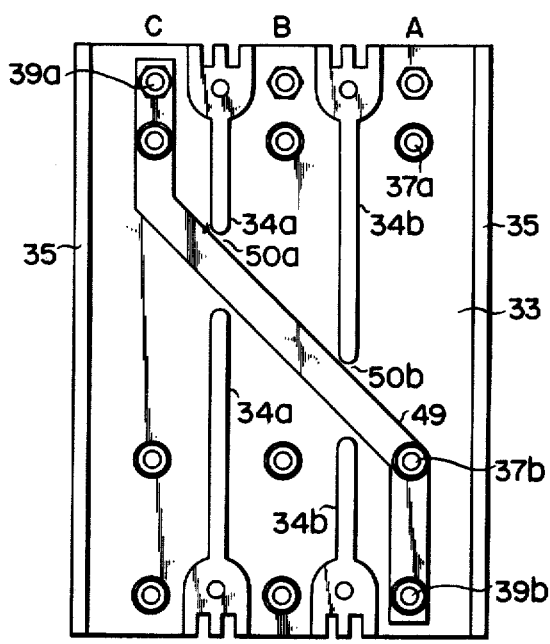

SURGE VOLTAGE ABSORBER

This invention relates to a surge voltage absorber including a plurality of surge voltage absorber units and more particularly to a surge voltage absorber capable of indicating destruction of its constituent units.

A surge voltage absorber having its constituent units received in an insulated case is connected to, for example, a multiphase A.C. circuit so as to reduce surge voltage occurring is any of the phases to a prescribed level. A known absorber unit consists of a nonlinear resistor for absorbing surge energy connected in series to a fusible element for cutting off any current resulting from an abnormal surge voltage. The melting of the fusible element or its separation from the aforesaid resistor is hereinafter referred to as the functional failure or destruction of the absorber unit. Where a plurality of absorber units constructed as described above are connected to the respective phases of, for example, a multiphase A.C. circuit, they do not always collectively fail upon the occurrence of a single surge voltage. If, however, one absorber unit is destroyed, then it will be impossible fully to protect the multiphase A.C. circuit from damage, even though the other absorber units may remain sound. For the full protection of the multiphase A.C. circuit, therefore, it is necessary that the absorber units themselves be provided with a means for indicating their failure and that where at least one of them fails, this event be made known by an electric signal or a proper protective device be put into operation. If, in this case, each of the absorber units is fitted with an electric signal generator for alarming its destruction, then there will arise the high cost of a surge voltage absorber and its complicated circuit arrangement with the resultant failure to make it compact.

It is accordingly the object of this invention to provide a compact inexpensive surge voltage absorber which comprises a plurality of constituent units received in an insulated case and each provided inside with an alarming member mechanically popping out upon destruction of the unit; and a single signal generator for giving forth an electric signal upon the projection of at least one of the alarming members.

A surge voltage absorber according to this invention comprises a molded case; a plurality of surge voltage absorber units each including a holding structure which holds a first outer terminal, nonlinear resistor element, fusible element, and second outer bored terminal all in electrical series, an alarming member popping out of the bore of said second center terminal when the fusible element does not constitute an element of the series circuit and a bias device for effecting the projection of the alarming member, the moment the fusible element does not constitute the series circuit; first external connection terminals for detachably holding the first outer terminals on one side of the inner bottom surface of the molded case and second external connection terminals for detachably holding the second center terminals on the other side of the inner bottom surface of the molded case, thereby supporting the surge voltage absorber units parallel in the same direction on the bottom surface; a lever disposed close to the bores of the second outer terminals on the other side of the bottom surface of the molded case so as to be actuated upon the projection of at least one of the alarming members; and a signal generator for giving forth an output signal upon the actuation of the lever.

The surge voltage absorber of this invention enables the destruction of a given constituent unit to be recognized simply by observing the projection of the corresponding alarming member out of the bore of the corresponding second outer terminal, and the destruction of at least one of the absorber units is alarmed by a detection signal delivered from a single signal generator, thus providing a compact inexpensive surge voltage absorber.

The surge voltage absorber of this invention can further be modified into a 3-phase type which can be connected to a 3-phase A.C. circuit in a compact state and the connection can easily be changed from the delta to the Y or from the Y to the delta arrangement in a compact state.

This invention can be more fully understood from the following detailed description when taken in conjunction with the accompanying drawings, in which.

Figure 1:
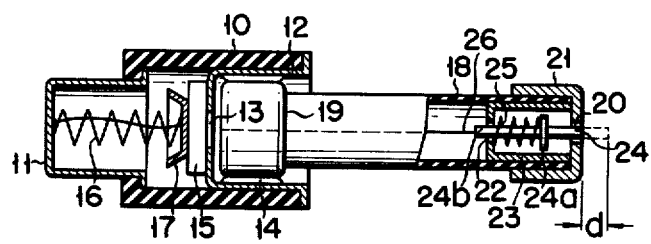
FIG. 1 is a fractional sectional view of the constituent unit of a surge voltage absorber according to an embodiment of this invention.
Figure 2A:
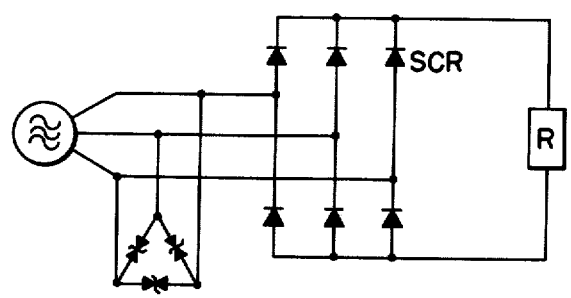
FIG. 2A shows three absorber units of FIG. 1 connected in the form of delta connection to the 3-phase source to a silicon controlled rectifier.
Figure 2B:
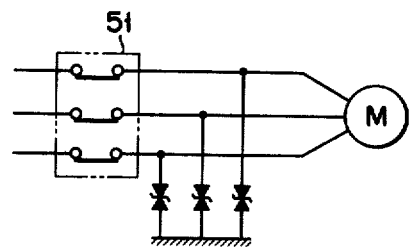
Figure 4A:
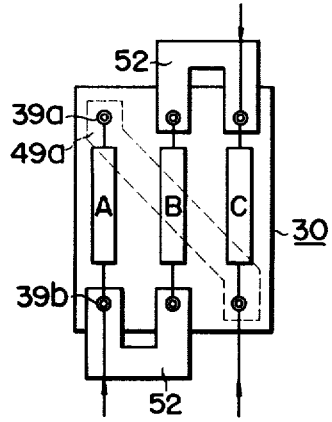
Figure 4B:
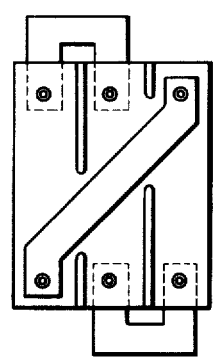
Figure 5A:
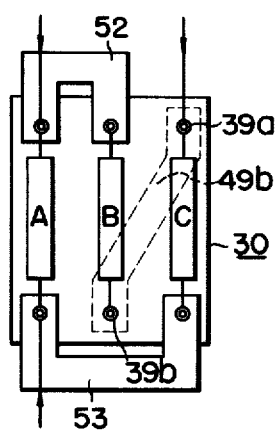
Figure 5B:
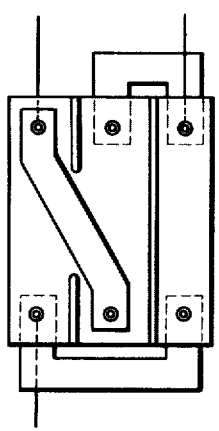

FIG. 2B indicates the absorber units of FIG. 1 connected to the 3-phase A.C. source of a motor in the form of the Y connection;

FIG. 3A is an elevation of the surge voltage absorber of FIG. 2A;

FIG. 3B is a sectional view on line IIIB—IIIB of FIG. 3A;

FIG. 3C is a plan view of FIG. 3A as looked at from the back side;

FIG. 4A is a schematic elevation of a 3-phase delta-connected surge voltage absorber according to another embodiment of the invention;

FIG. 4B is a schematic back view of FIG. 4A;

FIG. 5A is a schematic elevation of a 3-phase delta-connected surge voltage absorber according to still another embodiment of the invention;

FIG. 5B is a schematic back view of FIG. 5A; and

Figure 6:
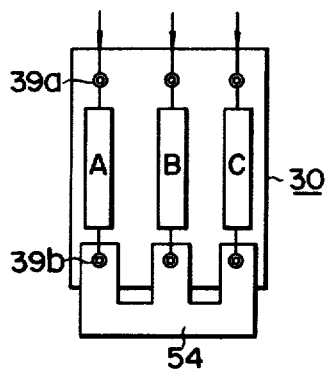

FIG. 6 is a schematic elevation of a Y-connnected 3-phase surge voltage absorber according to a further embodiment of the invention.

Referring to FIG. 1, a first outer terminal 11 is fixed to the indicated left end of a first insulating cylinder 10 by passing through a hole bored in the bottom of said first cylinder 10. A contact terminal 12 is inserted into an opening firmed on the indicated right side of the first cylinder 10. The contact terminal 12 has a through hole 13 bored in the bottom and an inwardly projecting elastic contact member 14 firmed on part of the peripheral wall of said contact terminal 12. A nonlinear resistor element 15 is fitted to that outer portion of the bottom of the contact terminal 12 which is disposed around the through hole 13. The nonlinear resistor element 15 is held in a prescribed position at a fixed pressure by the urging force of an elastic contact member 17 pressed to the indicated right side. A contact terminal 19 is fitted into the indicated left end of a second insulating cylinder 18. A second outer terminal 21 bored with a through hole 20 is inserted into the indicated right end of said second insulating cylinder 18. The open end of a metal cylinder 23 bored with a through hole 22 at the bottom is fixed in the second outer terminal 21. An alarming member 24 received in the metal cylinder 23 consists of a flange 24a and a stock 24b. A bias spring 25 is stretched across the bottom of the metal cylinder 23 and flange 24a so as to be wound about the stock 24b. The alarming member is inserted into the through holes 20 and 22 to move in the indicated horizontal direction. A fusible element 26 has its indicated left end fixed to the contact terminal 19 and its indicated right end attached to the stock 24b of the alarming member 24 so as to cause said alarming member 24 to be kept in the indicated position against the biasing force of the spring 25.

The second insulating cylinder 18 is inserted into the first insulating cylinder 10 so as to cause the contact terminal 19 to be held in contact with the elastic contact member 14. Thus the first and second insulating cylinders 10 and 18 jointly constitute a holding structure for supporting the first outer terminal 11, nonlinear resistor element 15, fusible element 26 and second outer terminal 21 in electrical series relationship.

Where the nonlinear resistor element 15 of the abovementioned surge voltage absorber unit is destroyed by surge voltage, then the fusible element 26 is melted away. In this case, the spring 25 causes the alarming member 24 to pop out of the second outer terminal 21 for a distance d.

The nonlinear resistor element 15 is destroyed when excess surge voltage is received, or ceases its surge absorbing function due to resistance being prominently reduced even in a normal operating condition during long use. The latter event must also be regarded as the destruction of the surge voltage unit, and the alarming member 24 should be made to pop out. To this end, it is necessary that the indicated left end of the fusible element 26 be fixed to the contact terminal 19 through a low-melting metal, for example, an alloy meltable at 100°C, thereby melting the low-melting alloy by heat generated by a predetermined leakage current of the nonlinear resistor element 15 and causing the alarming member 24 to pop out. The projection of the alarming member 24 can be easily effected by providing the contact terminal 19 with a projection (not shown) directly contacting the surface of the nonlinear resistor element 15 and fixing one end of the fusible element 26 to said projection through the low-melting alloy.

FIG. 3 shows an embodiment of this invention where three surge voltage absorber units are arranged in the form of delta connection. Formed on the inner bottom surface 31 of a molded case 30 are interphase ribs 32, side wall ribs 33a and two intermediate ribs 33b positioned between the side wall ribs 33a. Provided on the outer bottom surface 33 of the molded case 30 are interphase ribs 34a and 34b and side wall ribs 35 (FIG. 3C).

Three surge voltage absorber units of FIG. 1 are arranged parallel in the same direction above the inner bottom surface 31 of the molded case 30 in the form connected to the A, B and C phases respectively. The first outer terminal 11 of each absorber unit representing one of the three phases is detachably supported by a clip 38a fitted to the bottom surface of the molded case 30 by a screw 37a through a connection metal part 36a, which in turn is fixed to the inner bottom surface of the molded case 30 by a screw 39a. The second outer terminal 21 of each absorber unit is detachably supported by a clip 38b attached to the bottom plate of the molded case 30 by a screw 37b through a connection metal part 36b which in turn is fixed to the inner bottom surface of the molded case by a screw 39b. In this invention, screws 39a and 39b including the associated clips and connection metal parts are respectively referred to as first and second external connection terminals. Numeral 40 denotes holes for fixing the molded case 30.

A strip-shaped lever 41 has its pin 41a rotatably supported on the side wall rib 33a so as to swing in the direction of the indicated arrow 43 (FIG. 3B) at the center 41b when the alarming member 24 of at least one of the absorber units pops out. Interphase ribs 32 are positioned above the left side edge of the lever 41, and the right side edge thereof is biased in the indicated downward direction by a spring 45 connected at one end to a fixed member 44, thereby keeping the lever 41 in a horizontal position. The lever 41 is so designed as to be actuated upon the projection of at least one of the alarming members 24. The lever 41 need not be made to swing, but has only to be so constructed to present displacement upon the projection of at least one of the alarming members 24.

A microswitch 47 is disposed in a recess defined by two intermediate ribs 33b. A lever 47a for actuating the microswitch 47 is positioned closely below the lever 41 facing the three alarming members 24. When the lever 41 downwardly swings in the direction of the indicated arrow 43, the actuating lever 47a is brought downward to operate the microswitch 47. This operation closes an electric circuit, causing an alarming device or any other protective device (not shown) to be actuated.

The first external connection member 39a of the phase C and the second external connection member 39b of the phase A are detachably connected by a connection conductor 49. The interphase ribs 34a and 34b respectively have notches 50a and 50b formed at the points at which the interphase ribs intersect the connection conductor 49. This connection conductor 49 is set in place so as to pass through said notches 50a and 50b.

Reverting to FIG. 3A, the first external connection terminals 39a of the phases A and B are connected together to be supplied with the first phase voltage of the 3-phase power source; the second external connection terminals 39b of the phases B and C are connected together to be supplied with the second phase voltage of said power source; and the first external connection terminal 39a of the phase C is supplied with the third phase voltage of said power source.

Where it is desired to switch over the connection of the constituent units of the surge voltage absorber of FIG. 3A from the delta to the Y type, it is obviously only required to remove the connection conductor 49 of FIG. 3C, supply the first external connection terminals of the phases A, B and C with the A-, B- and C-phase voltages respectively, and jointly connect the second external connection terminals of the respective phases.

As seen from the foregoing embodiment, the destruction of the constituent unit of a 3-phase surge voltage absorber can be detected by the projection of the corresponding alarming member 24, and the functional failure as 3-phase absorber can be recognized by an electric signal delivered from a single microswitch 47. The surge voltage absorber of this invention can have the connection of its constituent units easily switched over between the delta and Y types and be constructed in a compact form at low cost.

This invention is also practicable without imposing any limit, if so demanded, on the manner in which the interphase ribs are formed on the backside of the surge voltage absorber of FIG. 3 and the first and second external connection terminals are interconnected, as well as on the number of constituent units included in said absorber.

FIG. 2A shows the delta-connected surge voltage absorber of this invention connected parallel to a 3-phase power source used with an SCR 3-phase rectifier. FIG. 2B indicates the Y-connected surge voltage absorber of the invention connected parallel to a motor M impressed with 3-phase voltage through a 3-phase interrupter 51.

FIG. 4A illustrates another embodiment of this invention, where the first external connection terminal 39a of the phase A is connected to the second external connection terminal of the place C by a connection metal part 49a, the first external connection terminals of the phases B and C are connected together by a connection metal part 52, and the second external connection terminals of the phases A and B are connected together by a similar connection metal part 52. FIG. 4B is a backside plan view of FIG. 4A showing interphase ribs.

FIG. 5A indicates still another embodiment of this invention, where the first external connection terminal 39a of the phase C is connected to the second external connection terminal 39b of the phase B by a connection metal part 49b, the first external connection terminals of the phases A and B are connected together by a connection metal part 52, and the second external connection terminals of the phases A and C are connected together by a connection metal part 53. FIG. 5B is a backside plan view of FIG. 5A. In this embodiment, only one of the backside interphase ribs has its bottom notched.

FIG. 6 presents a further embodiment of this invention, where the second external connection terminals 39b of the phases A, B and C are connected together by a connection metal part 54, and the first external connection terminals 39a of the respective phases is supplied with 3-phase voltage.

What we claim is:

1. A surge voltage absorber comprising:

a plurality of surge voltage absorber units each having an insulation tube provided with first and second terminals at their ends respectively, a non-linear resistor element electrically connected at its one end to said first terminal, a fusible element connected at its one end to the other end of said non-linear resistor element, and a projection pin which is connected to the other end of said fusible element and supported in said second terminal so as to be connected to said second terminal and to be projected by a bias means through a hole of said second terminal when said fusible element is interrupted;

an insulation substrate provided with first and second external connection terminals which serve to arrange in parallel a plurality of said surge absorber units in the same direction and detachably support said absorber units at their first and second terminals, respectively;

a lever rotatably mounted on said insulation substrate, one surface of said lever facing in common all the projection pins of said absorber units; and a signal generator provided on said insulation substrate on the side facing the other surface of said lever so as to be operated by rotation of said lever, said rotation being caused by projection of at least one of said projection pins.

2. A surge voltage absorber according to claim 1, wherein said surge voltage absorber has a molded case, said molded case is fitted with three first external connection terminals and three second external connection terminals cooperating in detachably supporting three of said surge voltage absorber units to be connected to the respective phases of a 3-phase A.C. circuit, and is provided with ribs on the outer bottom surface of said molded case between the respective phases, those of said ribs which are intersected in the delta connection of said three surge voltage absorber units by a conductor connecting said first and second external connection terminals of different phases on said outer bottom surface being provided with notches at the points of said intersections for passing said conductor therethrough.

* * * * *